United States Patent [19]
Aoyama

[11] Patent Number: 5,191,691
[45] Date of Patent: Mar. 9, 1993

[54] APPARATUS FOR FEEDING SLENDER PARTS

[76] Inventor: Yoshitaka Aoyama, 20-11, Makitsukadai 2-chome, Sakai-shi, Osaka 590-01, Japan

[21] Appl. No.: 830,970

[22] Filed: Feb. 10, 1992

Related U.S. Application Data

[60] Continuation of Ser. No. 667,933, Mar. 12, 1991, abandoned, which is a division of Ser. No. 392,513, Aug. 11, 1989, Pat. No. 5,035,039.

[30] Foreign Application Priority Data

| Aug. 15, 1988 | [JP] | Japan | 63-202948 |
| Aug. 22, 1988 | [JP] | Japan | 63-208624 |
| Aug. 22, 1988 | [JP] | Japan | 63-208625 |

[51] Int. Cl.$^5$ .................................. B25B 27/14
[52] U.S. Cl. ............................ 29/281.4; 29/281.1; 29/DIG. 95; 29/DIG. 105; 81/125; 81/451
[58] Field of Search ............... 29/281.1, 281.4, 281.5, 29/455, DIG. 95, DIG. 105; 81/125, 451

[56] References Cited

U.S. PATENT DOCUMENTS

| 789,941 | 5/1905 | Sibley | 81/451 X |
| 1,155,724 | 10/1915 | Harnly | 81/451 X |
| 2,671,369 | 3/1954 | Clark | 81/125 |
| 2,753,747 | 7/1956 | Brown | 81/125 |
| 3,178,971 | 4/1965 | Bachli et al. | 81/125 |
| 3,392,767 | 7/1968 | Stillwagon, Jr. | 81/125 X |

FOREIGN PATENT DOCUMENTS 150459 6/1955 Sweden .................. 81/125

Primary Examiner—Joseph M. Gorski
Assistant Examiner—Peter Dungba Vo
Attorney, Agent, or Firm—Nikaido, Marmelstein, Murray & Oram

[57] ABSTRACT

An apparatus for feeding slender parts has a feed rod adapted to magnetically hold a slender part on its front end, and a projecting piece formed on the front end of the feed rod for supporting the part from below. In the case of a headed slender part such as a projection bolt, the projecting piece includes a stopper portion for receiving the head and a support portion for supporting the stem portion of the part. When the feed rod is extended until it reaches a predetermined position, the effect of the magnetic force on the part is forcibly nullified, with the result that the part, while rotatively rising, falls under its own weight to fit in a bolt hole or the like in a mating member positioned below.

5 Claims, 3 Drawing Sheets

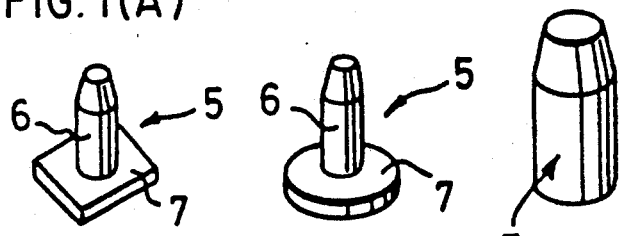
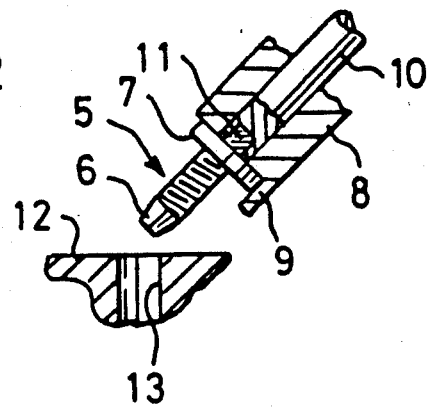
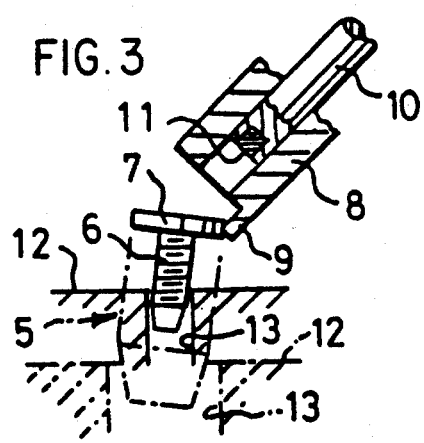
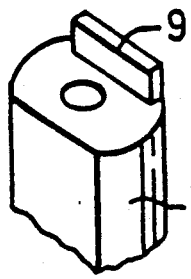
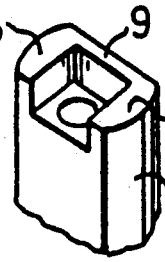
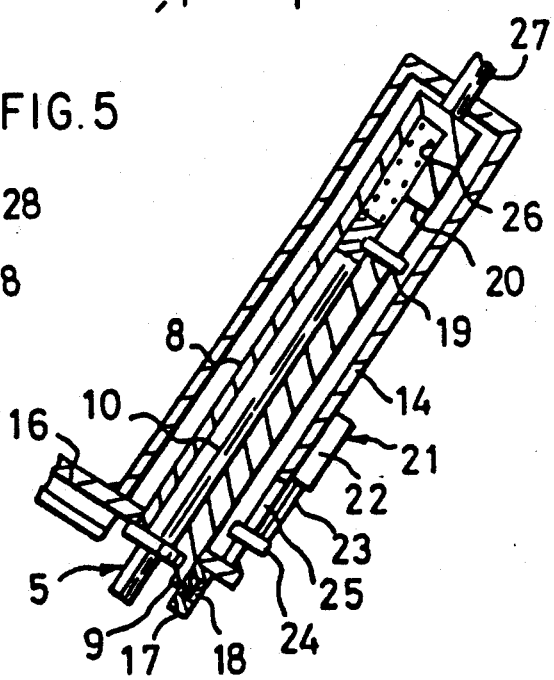

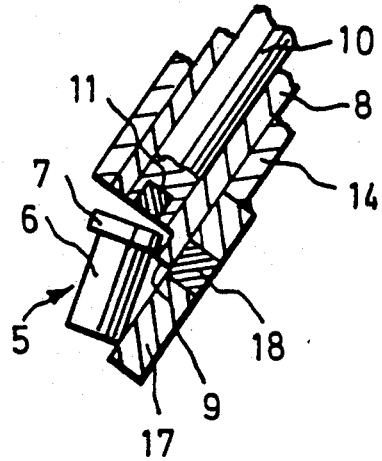
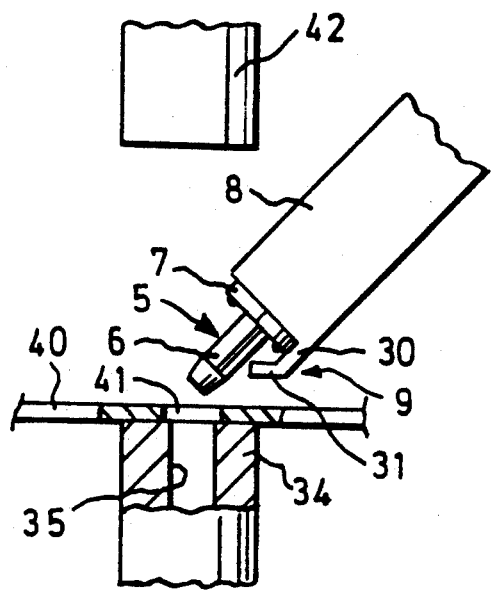
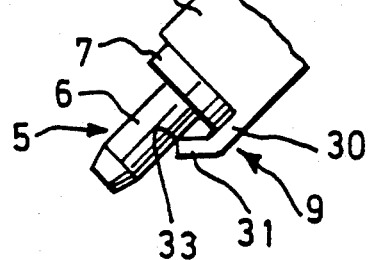
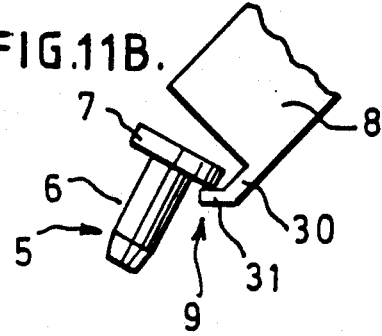
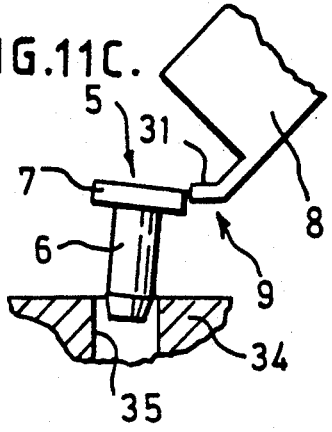
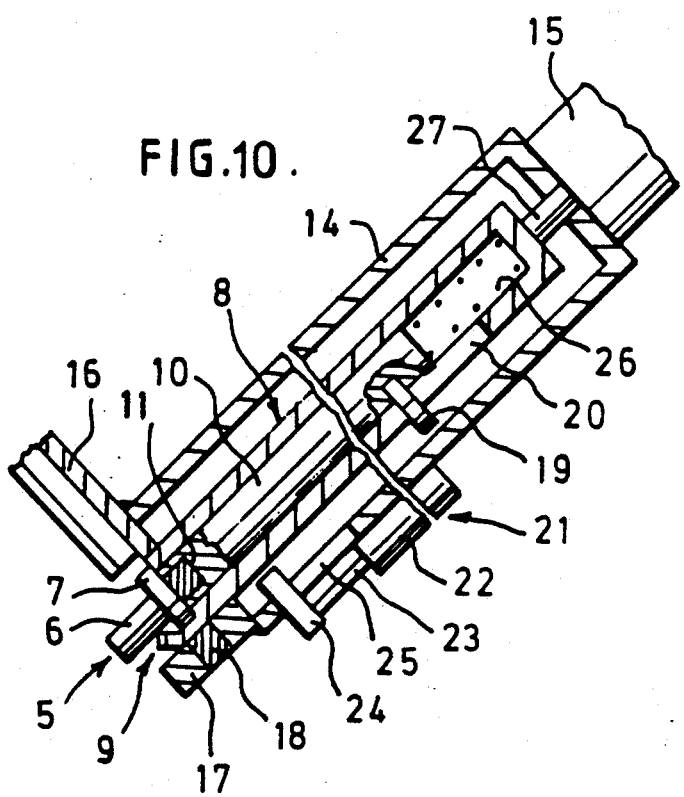

APPARATUS FOR FEEDING SLENDER PARTS

This application is a continuation of application Ser. No. 667,993 filed Mar. 12, 1991, now abandoned, in turn is a divisional of U.S. Ser. No. 392,513, filed Aug. 11, 1989, U.S. Pat. No. 5,035,039.

BACKGROUND OF THE INVENTION

1. Field of the Invention

This invention relates to a method and apparatus for feeding slender parts, such as shafts and bolts, to a predetermined place, such as a hole in a steel plate part or a guide hole for s pot welding electrode.

2. Prior Art

In an example of prior art, a chuck mechanism is attached to the front end of a feed shaft connected to a hydraulic cylinder, and the pair of dogs grip a bolt. In this state, the feed shaft is retracted and moved until the bolt reaches an intended place, whereupon the dogs are opened by the action of the chuck mechanism to release the bolt; in this manner, feeding is completed.

In the prior art described above, since the chuck mechanism itself must be provided with a driving device such as an electromagnetic drive or an air cylinder, the chuck mechanism becomes complicated and large-sized. Further, the dogs also become large-sized depending upon the size and shape of slender parts. Therefore, feeding of parts to narrow places becomes difficult. In the method of gripping and feeding a slender part by dogs, even if there is any slight dimensional error in the dogs or there is a foreign substance such as an iron scrap interposed between the dogs and the part, the part holding attitude is undesirably inclined, making it difficult to attain correct feeding.

SUMMARY OF THE INVENTION

This invention has been accomplished to solve the problems described above. An embodiment of the invention comprises a projecting piece disposed on the front end of a feed rod for holding a lender part from below, wherein the feed rod, holding a slender part on its front end by magnetic attraction force, is moved obliquely downward and substantially horizontally until it stops just short of the intended place, whereupon the effect of the magnetic attraction force on the slender part is nullified and then the slender part rotatively stands as it is supported at its upper region by the projecting piece and is dropped to a predetermined place on a mating member. With this arrangement, the slender part can be stably held on the feed rod and accurately fed to a predetermined place as it rotatively stands.

A projecting piece consisting of a stopper portion for receiving the head of a slender part and a support portion adapted to be contracted by the stem portion of said part is provided on the front end of the feed rod and positioned below the part. With the head sliding along the inner surface of the projecting piece, the slender part rotatively stands and then falls to a predetermined place on a mating member. The stem portion and head of the part contact the projecting piece while receiving rotative force during rotation, so that the part rotatively stands; in this manner, the part is separated from the projecting piece and falls.

These and other features of the invention will become more apparent from the following description to be taken in conjunction with the accompanying drawings, wherein like parts are denoted by like reference numerals.

BRIEF DESCRIPTION OF THE DRAWINGS

FIGS. 1 (A)–(C) are perspective views showing some forms of slender part;

FIGS. 2 and 3 are vertical sectional views showing phases of feed of a slender part;

FIGS. 4 and 5 are perspective views of the front ends of projecting pieces, showing somes forms of projecting piece;

FIG. 6 is a vertical sectional view showing the entire feed apparatus;

FIG. 7 is a longitudinal sectional view of the feed apparatus;

FIG. 8 is a sectional view of the front end of a feed rod, showing an abnormal part holding state;

FIG. 9 is a schematic vertical sectional view, showing a phase of feed of a projection bolt;

FIG. 10 is a longitudinal sectional view of the feed apparatus;

FIGS. 11A–11C are schematic views showing phases of feed of a slender part;

DESCRIPTION OF THE PREFERRED EMBODIMENTS

Figure 12:
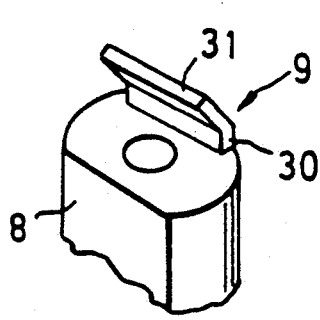
FIG. 12 is a perspective view of the front end of the feed rod.

First, referring to FIGS. 1 through 7 showing a first embodiment, a slender part (hereinafter referred to simply as a part) is denoted by the reference numeral 5. It has a stem portion 6 which may have attached thereto a quadrangular head 7 shown in FIG. 1 (A) or a circular head 7 as shown in FIG. 1 (B) or it may be of the cylindrical type as shown in FIG. 1 (C).

A method of feeding the part 5 will now be described with reference to FIGS. 2 and 3. The front end of a feed rod 8 is provided with a projecting piece 9 in the form of a plate adapted to hold the upper portion of the part 5 from below. The part 5 shown in solid line is a bolt having a head 7. The shape of the projecting piece 9 may be such as shown in FIG. 4 in the case where the head 7 is quadrangular as shown in FIG. 1 (A), but in the case where the head 7 is in the form of a circular plate as shown in FIG. 1 (B), preferably the projecting piece 9 is provided with wall portions 28 on opposite sides thereof to form a C-shaped frame adapted to prevent the head 7 from rolling. In order to hold the part 5 on the front end by magnetic attraction force, the feed rod 8 is hollow, as illustrated, and has an inner rod 10 inserted therein which is slidable, said inner rod having a magnet (permanent magnet) 11 fixed on the front end thereof, said magnet 11 being flush with the lower end of the feed rod 8, as illustrated. The feed rod 8 is adapted to make obliquely downward and substantially horizontal strokes.

An example of a place on a mating member 12 to which the part 5 is to be fed is a hole 13 formed in a member 12 as shown in FIGS. 2 and 3, and in this case it is desired to advance a bolt 5 into the hole 13. In the case where the part has a shape shown in FIG. 1 (C), the hole is in the form shown in dash-double-dot line in FIG. 3.

FIG. 2 shows the head 7 of the bolt 5, magnetically attracted to the front end surface of the feed rod 8, being advanced to a position adjacent the mating member 12 and stopped there. In this state, the front end of the bolt 5 is positioned very close to the hole 13. Subsequently, the inner rod 10 is retracted from the state of FIG. 2 to separate the magnet 11 from the head 7 as shown in FIG. 3, whereupon the effect of the magnetic attraction force on the bolt 5 disappears, with the result that the bolt 5 supported on the inner surface of the projecting piece 9 counterclockwise rotatively stands and then fits in the hole 13. During the transition period of this rotative rising, the head 7 slides along the inner surface of the projecting piece 9 while changing its position of contact with said inner surface until it falls from its contact state shown in FIG. 3 into the hole 13.

Referring to FIGS. 6 and 7 showing the entire apparatus, a feed rod 8 like the one shown in FIGS. 2 and 3 is reciprocably received in a sleeve 14, and an operating cylinder (air cylinder) 15 is connected to the upper end of the sleeve 14 while a chute 16 is welded to the lower end of the sleeve 14 to introduce bolts with their heads 7 hanging therefrom. A guide plate 17 is fixed to the end of the chute 16 and a magnet (permanent magnet) 18 embedded therein serves to attract and introduce bolts 5.

The mechanism in which the magnet 11 (or the inner rod 10) is forcibly retracted as in FIG. 3 will now be described with reference to FIG. 7. A control pin 19 fixed to the inner rod 10 extends through an elongated opening 20 formed in the feed rod 8 and extending in the direction of stroke, said control pin projecting outside the feed rod. A driving device 21 is fixed to the outer side of the sleeve 14. An electromagnetic solenoid may be employed as said driving device 21. In this case, however, an air cylinder 22 is shown by way of example. An engaging piece 24 fixed to the front end of a piston rod 23 extends through an elongated opening 25 to enter the sleeve, said elongated opening 25 being formed in the sleeve 14 to extend in the direction of stroke. And the control pin 19 and the engaging piece 24 are opposed to each other so that they can abut against each other. In addition, a compression coil spring 26 is interposed between the inner rod 10 and the feed rod 8, the spring force thereof being counteracted by the control pin 19 being pressed against the lower end of the elongated opening 20. Further, denoted by the reference numeral 27 is the piston rod of said operating cylinder 15, said piston rod being joined to the feed rod 8.

When the feed rod 8 is advanced from the state of FIG. 7 by the piston rod 27 until it stops just short of the intended place, the control pin 19 also stops just short of the engaging piece 24. When the engaging piece 24 is pulled up by the air cylinder 22, the inner rod 10 is forcibly retracted as shown in FIG. 3 through the control pin 19.

The nullification of the effect of the attraction force on the bolt 5 is effected substantially at the same time as and preferably immediately after the feed rod 8 is stopped.

As already described, since the part is magnetically held on the front end of the feed rod, it is no longer necessary to employ a complicated large-sized chuck mechanism as in the prior art and hence it is now possible to feed parts to narrow places. Because of the provision of a projecting piece on the front end of the feed rod for holding a part from below and nullification of the effect of the magnetic attraction force effected substantially at the same time as the forward movement of the feed rod is stopped, the part rotatively stands whereby the path of travel of the part is made constant, ensuring accurate feeding of the part to the intended place.

An embodiment shown in FIGS. 9 through 16 will now be described. It is used in the field where headed slender parts such as projection bolts must be inserted in intended places, for example, guide holes formed in fixed electrodes, particularly in the field where emphasis is put on accurate initial attitude of headed slender parts.

In the case where the first embodiment described above is applied to a headed slender part such as a projection bolt, such part will sometimes assumes an abnormal attitude as shown in FIG. 8. That is, for some reason or other, the part 5 defines a large gap between it and the lower end surface of the feed rod, as illustrated, so that the axis of the part 8 is not aligned with the axis of the feed rod. This means that the initial attitude of the part 5 has not been correctly set. Thus, there arises the problem of the part 5 deviating from the feed rod at the time of advance of the feed rod or not being correctly fed to the intended place on the mating member. Said some reason or other includes one caused by the fact that the attraction force of the magnet 11 is decreased with the attraction force of the other magnet 18 becoming greater.

Reference will now be made to FIG. 9, in which case a projection bolt 5 is to be welded to a steel plate part 40. The steel plate part 40 is placed on a fixed electrode 34 so that a through-hole 41 in the steel plate part is aligned with a guide hole 35 in the electrode. The feed rod 8 is adapted to descend obliquely from above, as illustrated, with the head 7 of the bolt 5 magnetically attracted to the end surface of said feed rod. Further, the projecting piece 9 consists of a stopper portion 30 and a support portion 31, as will be later described, and it is arranged that the bolt stem is allowed to contact the support portion 31. In addition, the reference numeral 42 denotes a movable electrode paired up with the fixed electrode 34.

Figure 13:
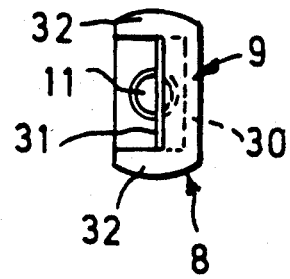
FIGS. 13 and 14 are an end view and a longitudinal sectional view of the feed rod.
Figure 14:
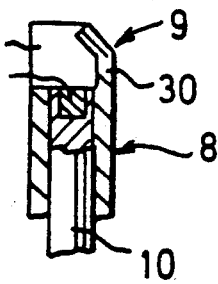

Referring to FIG. 10, the feed rod 8 adapted to make reciprocating strokes is disposed obliquely downward as illustrated and substantially horizontally and its front end is adapted to magnetically attract a part 5 consisting of a head 7 and a stem portion 6. The front end of the feed rod 8 is provided with a projecting piece 9 for holding the upper portion of the part 5 from below. This projecting piece 9 is bent, as shown in FIGS. 11 (A) through 11 (C), and consists of a stopper portion 30 for receiving the head 7 and a support portion 31 adapted to be contacted by the stem portion 6. In the case of a part having a quadrangular head, as shown in FIG. 1 (A), a projecting piece 9 shown in FIG. 12 is sufficient. However, in the case of a part having a circular head as shown in FIG. 1 (B), preferably the projecting piece 9 is provided on opposite sides with lateral walls 32 to form a C-shape, as shown in FIGS. 13 and 14.

Figure 15:
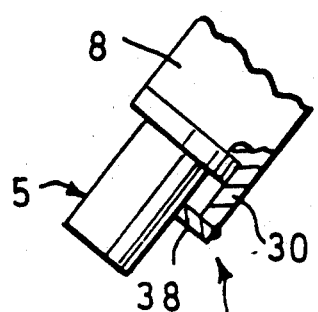
FIG. 15 is a side view, partly in section, of the front end of the feed rod using an electromagnet.

As shown in FIG. 15, a support piece 38 in the form of a separate member may be welded substantially at right angles to form an inverted L-shaped projection 9.

The apparatus shown in FIG. 10 is in the same as the one shown in FIG. 7 except for the projecting piece 9, and its operation will now be described. The feed rod 8 magnetically holding the part 5 is advanced to a predetermined place by the output power of the air cylinder 15 and when it stops there, the control pin 19 has come close to the engaging piece 24, and then the action of the air cylinder 22 raises the engaging piece 24 so that its displacement is transmitted to the control pin 19 and to the inner rod 10, and the magnet 11 is separated from the head 7, so that the effect of its attraction force on the part 5 disappears.

How the part 5 falls after said effect disappears is shown in FIGS. 11 (A) through 11 (C). In FIG. 11 (A), the head 7 is in close contact with the end surface of the feed rod under the magnetic attraction force, when the corner of the front end of the support portion 31 is in contact at 33 with the stem portion 6, preventing the part 5 from assuming an abnormal attitude as in FIG. 8. When the effect of the magnetic attraction force disappears, the part 5 describes a path of movement which is a combination of the movement of the head 7 sliding along the inner surface of the stopper portion 30 and the counterclockwise rotation around the contact point 33. FIG. 11 (B) shows the initial stage of the combined movement and FIG. 11 (C) shows the head 7 falling as it is separated from the support portion 31.

Figure 16:
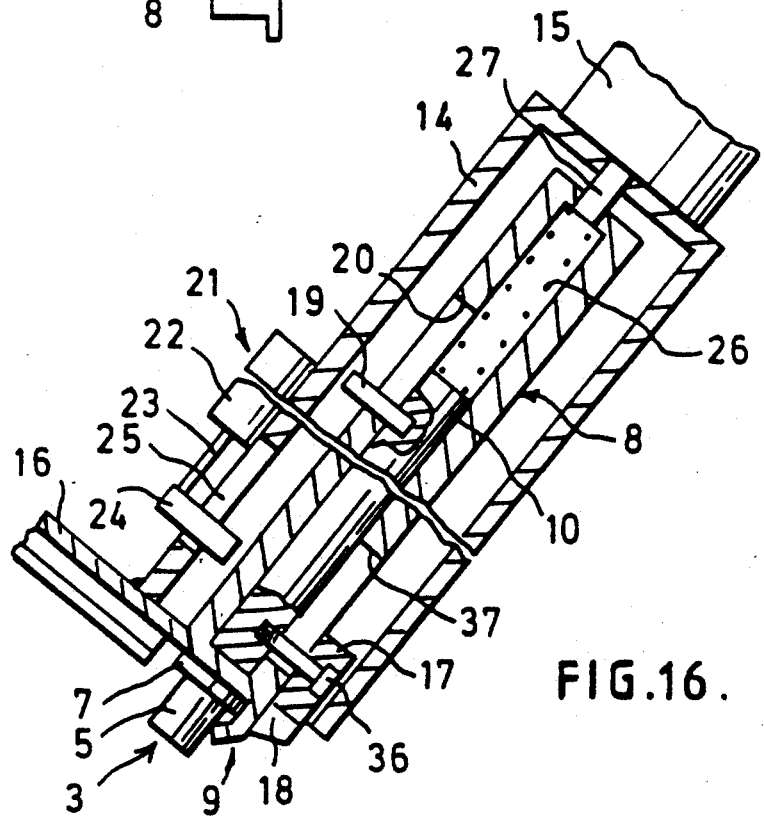
FIG. 16 is a longitudinal sectional view of the feed apparatus.

The apparatus shown in FIG. 16 is designed to nullify the effect of magnetic force on the part 5 by retracting a magnet-equipped guide plate 22, and only those portions which differ from the apparatus shown in FIG. 10 will be described. A guide plate 17 having a magnet 18 integral therewith is slidable in the direction of stroke on the outer surface of the feed rod 8 and is integrated with the inner rod 10 by a bolt 36 which extends through an elongated opening 37 formed in the feed rod 8 to extend in the direction of stroke. In addition, the inner rod has no magnet mounted thereon, but depending upon the weight of the part and balance between the head and the stem portion, a magnet may be mounted thereon as shown in FIG. 10.

The part is transferred in correct attitude to a predetermined place by the projecting piece, and the attitude of the part in the vicinity of the intended place is constant, enabling the part to fall while it rotatively stands as described above; thus, the path of travel of commodities is made uniform to ensure correct feeding with high reliability.

Coupled with the realization of the highly practical behavior of parts described above, the provision of a projecting piece of special shape and an arrangement for controlling the presence or absence of magnetic attraction force made it possible to embody the invention with much less space than in the case of the conventional apparatus provided with a chuck mechanism at the front end of the feed rod; thus, parts can be feed to narrow places.

The invention has solved the problems associated with the chuck mechanism and space described above while developing its unique features.

Figure 17:
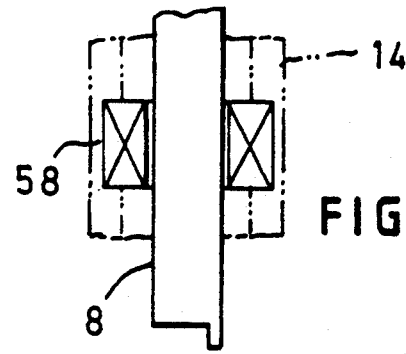
FIG. 17 is a schematic view of a feed rod using an electromagnet.

The means for imparting a magnetic force to the front end of the feed rod is not limited to a permanent magnet used in the illustrated embodiments. For example, in FIG. 17, an electromagnet is shown. In this case, the feed rod 8 is inserted in an exciting coil 58 and magnetic attraction force is removed by cutting off the exciting current after the feed rod 8 has advanced by a predetermined amount.

What is claimed is:

1. An apparatus for feeding slender parts, comprising:
a feed rod operatively mounted for advancing in an oblique downward and horizontal direction and for retraction in a reverse direction;
part transfer means operatively connected to a fore end of said feed rod, for holding and transferring a slender part held thereon to a selected location; and
a magnet means located at the fore end of said feed rod and operatively positioned with said part transfer means, for magnetically attracting and holding the part in said part transfer means so as to allow transfer of the part, said magnet means being further for releasing the part from said part transfer means when positioned at the selected location,
said part transfer means including a stopper portion for receiving a head of the part during transfer of the part and release guide means for guiding a rotative release motion of the part when said magnet means releases the part therefrom, the release guide means having a horizontal support extension that contacts a stem portion of the part during transfer and releasably guides the rotative release motion of the part through contact with the stem portion during release of the part.

2. The apparatus for feeding slender parts as claimed in claim 1, wherein said magnet means includes a magnet holding rod positionally aligned with said feed rod so as to advance and retract relative to said feed, rod, and a permanent magnet mounted on a fore end of the holding rod and operatively positioned so as to be advanced with the holding rod when holding the part and retracted when releasing the part.

3. The apparatus for feeding slender parts as claimed in claim 1, wherein said magnet means includes an electromagnet operatively positioned with said part transfer means so as to be activated when holding the part and deactivated with releasing the part.

4. The apparatus for feeding slender parts as claimed in claim 1, wherein said part transfer means includes a secondary magnet positionally aligned with the release guide means so as to attract the part during release and thereby control the rotative release motion of the part.

5. The apparatus for feeding slender parts as claimed in claim 1, wherein the release guide means of said part transfer means includes wall portions located on opposing sides of the horizontal support extension.

* * * * *